(12) United States Patent
Chen

(10) Patent No.: US 7,003,056 B2
(45) Date of Patent: Feb. 21, 2006

(54) SYMBOL TIMING TRACKING AND METHOD THEREFOR

(75) Inventor: Weizhong Chen, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 766 days.

(21) Appl. No.: 10/207,469

(22) Filed: Jul. 29, 2002

(65) Prior Publication Data

US 2004/0017864 A1    Jan. 29, 2004

(51) Int. Cl.
H04L 27/06     (2006.01)

(52) U.S. Cl. .................................... 375/343; 375/354

(58) Field of Classification Search ................ 375/142, 375/144, 145, 148, 149, 150, 285, 343, 346, 375/354, 355, 362, 364, 365, 368
See application file for complete search history.

(56) References Cited

U.S. PATENT DOCUMENTS

| 6,717,996 B1 * | 4/2004 | Du Reau et al. ............. 375/343 |
| 6,865,174 B1 * | 3/2005 | Tsubouchi et al. ........... 370/342 |
| 2002/0161737 A1 * | 10/2002 | Chi et al. ....................... 707/1 |
| 2003/0031121 A1 * | 2/2003 | Sudo ............................ 370/203 |

FOREIGN PATENT DOCUMENTS

WO   WO 01/80508 A2   10/2001

OTHER PUBLICATIONS

Patenaude et al.; *A New Symbol Timing Tracking Algorithm For π/2-BPSK and π/4-QPSK Modulations*; ICC Proceedings; pp. 1588-1592; 1992.

Cheol-Hee Park et al.; *Channel Estimation And DC-Offset Compensation Schemes For Frequency-Hopped Bluetooth Networks*; IEEE Communications Letters, vol. 5, No. 1, Jan. 2001; 3 pages.

Cheol-Hee Park et al.; *Techniques For Channel Estimation, DC-Offset Compensation, And Link Quality Control In Bluetooth System*; IEEE Transactions on Consumer Electronics, vol. 46, No. 3, Aug. 2000; pp. 682-689.

* cited by examiner

Primary Examiner—Don N. Vo
(74) Attorney, Agent, or Firm—Robert L. King

(57) ABSTRACT

A system and method in a communication device (10) uses timing tracking to correct timing drifting due to the difference in frequency of a transmitter clock and a receiver clock. With the timing tracking, correlation values of three consecutive samples are calculated using the receive signal and the recovered symbols and then summed. A timing signal, $(n_k, frac_k)$ is updated based upon a metric calculated from a previous correlation value, $R_{-1}$, present correlation value $(R_0)$ and a next con-elation value $(R_{+1})$. Adjustment of timing signal is based on the relative location with respect to the current timing of a peak of a second order polynomial curve formed by the first correlation value $R_{-1}$, the second correlation value $R_0$ and the third correlation value $R_{+1}$.

21 Claims, 4 Drawing Sheets

SYMBOL TIMING TRACKING AND METHOD THEREFOR

FIELD OF THE INVENTION

This invention relates generally to data communication systems, and more specifically, to clock timing tracking within data communication systems.

BACKGROUND OF THE INVENTION

Data communication systems typically utilize a transmitting device that operates under control of a first clock and an independent receiving device that operates under control of a second clock. Although the first clock and the second clock may be designed to operate at exactly the same desired frequency, the reality is that there is clock speed variation associated with each clock. Therefore, the transmitting device and the receiving device have a clock rate difference. This clock rate difference causes the receiver to see the incoming data at either faster or slower than expected, hereafter referred to as "timing drifting", thus being unable to properly acknowledge and process the data.

In packet based transmission systems, generally there is a known synchronization bit pattern that allows a receiver to recognize the beginning of a packet transmission. For packet based communication systems, if the amount of the maximum possible timing drift during the packet is much smaller than a symbol period, then this clock rate difference can be ignored. However, for a communication system with high symbol rate and long packet size, such as the Bluetooth High Rate and the 802.11b standards, the timing drift creates significant data errors. Patenaude et al. disclosed in "A New Symbol Timing Tracking Algorithm for π/2-BPSK and π/4-QPSK Modulations" in the ICC Proceedings, pages 1588–1592 (1992), a technique for implementing timing tracking in a communication system. The approach proposed by Patenaude et al. is complex and requires a significant amount of hardware and calculations. Therefore, power consumption and the cost of the tracking circuitry are significant deterrents to using Patenaude's approach.

BRIEF DESCRIPTION OF THE DRAWINGS

The present invention is illustrated by way of example and not limitation in the accompanying figures, in which like references indicate similar elements.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION

Figure 1:
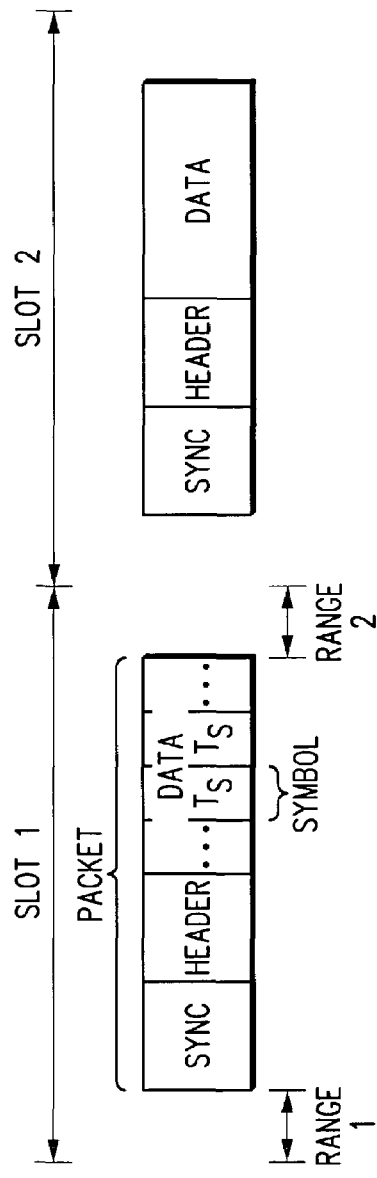
FIG. 1 illustrates in packet diagram form successive packet transmissions of a data communication system.

Illustrated in FIG. 1 is a packet diagram of two neighboring packets transmitted in two successive time slots, Slot 1 and Slot 2. In the illustrated form, each of the slots lasts longer than the length of each packet to prevent packet collision. Within each packet are distinct fields. A synchronization field, SYNC, is at the beginning of the packet. The SYNC field is followed by a Header field. After the Header is a data field. The data field contains a plurality of individual symbols, labeled $T_s$. The data packet must begin in Slot 1 in a specified range or at least by the end of a time range designated as Range 1. Further, the data packet must end at any time within a second time range or at least by the end of a time designated as Range 2. Although only two specific data symbols are illustrated in FIG. 1, it should be well understood that a large number of data symbols may be included within the data field of each packet as indicated by the dots in FIG. 1. Additionally, each data symbol contains a plurality of individual data samples (not shown) and a plurality of data symbols within a packet form one of a plurality of data blocks within a single packet.

Figure 2:
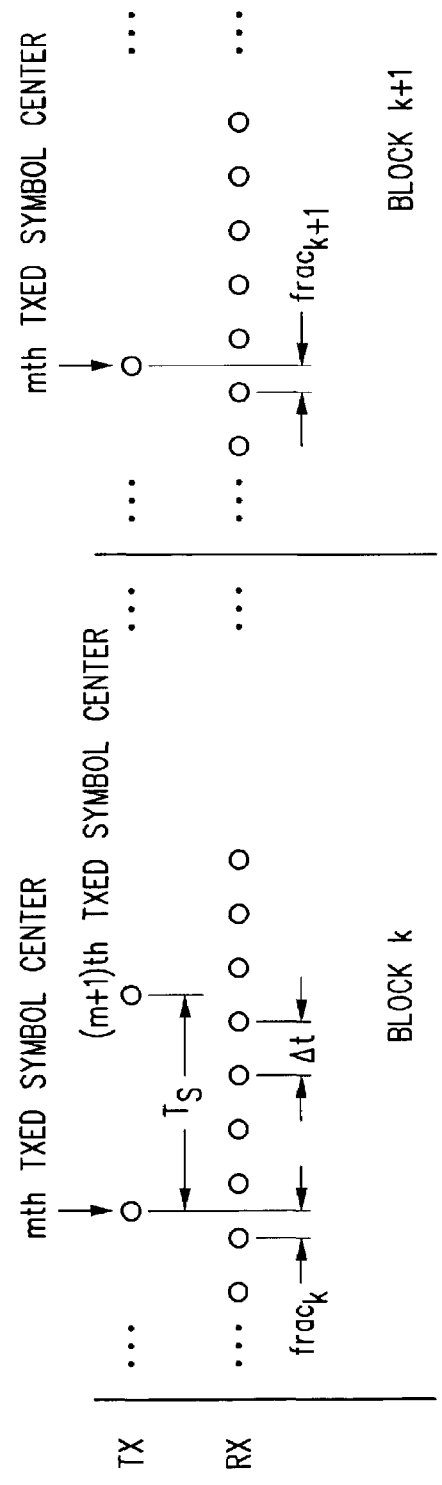
FIG. 2 illustrates in timing diagram form transmitted and received data samples where a clock timing skew exists.

Illustrated in FIG. 2 is a relationship between the transmitted symbol center and the received samples. In the illustrated form, there are two blocks of data. A first block of data is labeled block k and an immediately successive block of data is labeled block k+1. Between symbol centers, such as centers m and (m+1) in block k, there are four samples per transmitted symbol. It should be well understood that other numbers of samples could be implemented. The sampling interval of the received samples is designated as $\Delta t$. Because the transmitter clock and the receiver clock are not operating at the exact same frequency and phase, there will be a sampling clock phase difference, represented as $frac_k$, between the transmitted symbol centers and the received samples. As the time goes on, the sampling clock phase difference will vary and drift. In other words, the timing, $frac_k$ and $frac_{k+1}$, of two successive blocks k and (k+1) may differ.

Figure 3:
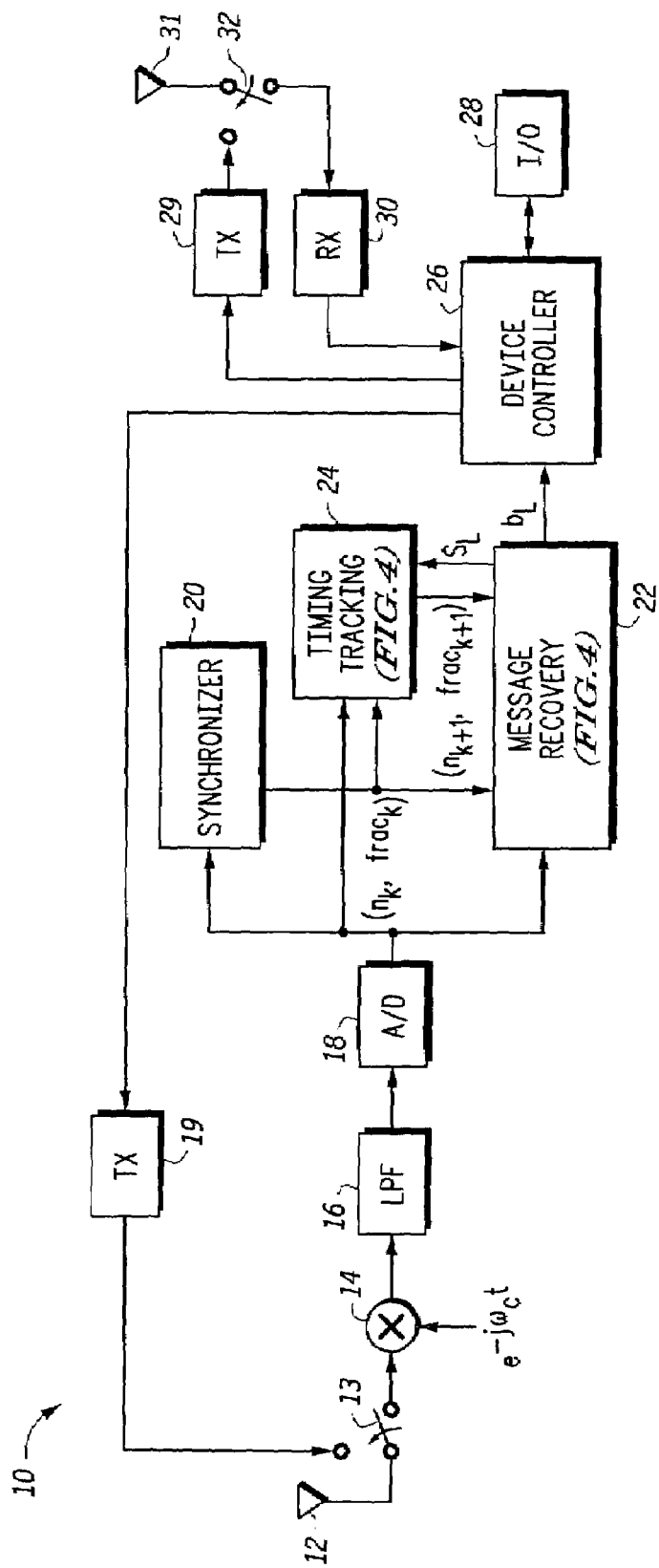
FIG. 3 illustrates in block diagram form a communication device for use with the present invention.

Illustrated in FIG. 3 is a communication device 10. An antenna 12 is connected to a terminal of a switch 13 that is controlled in response to whether communication device 10 is transmitting or receiving information via antenna 12. A second terminal of switch 13 is connected to a first input of a mixer 14. Switch 13 also has a third terminal. A second input of mixer 14 receives the signal $e^{-j\omega_c t}$. An output of mixer 14 is connected to an input of a low pass filter (LPF). An output of low pass filter 16 is connected to an input of an analog-to-digital (A/D) converter 16. An output of A/D converter 16 is connected to an input of a synchronizer 20, to a first input of a message recovery circuit 22 and to a first input of a timing tracking circuit 24. Mixer 14, low pass filter 16, A/D converter 8, synchronizer 20, timing tracking 24 and message recovery 22 collectively form a first receiver. The synchronizer 20 derives an initial timing value of ($n_k$, $frac_k$) for the packet that is connected to a second input of timing tracking circuit 24 and to a second input of message recovery circuit 22. For this notation, $n_k$ is a sampling index value for a data block k and $frac_k$ has a value between zero and one and represents the fraction of a sampling interval for the data block k. This initial timing value can be considered to be the center of the first symbol in the data block. This initial timing value provides the message recovery 22 with the timing information necessary to start message recovery from the received signal. This initial timing also is used by the timing tracking circuit 24 to update the timing by calculating a value of ($n_{k+1}$, $frac_{k+1}$)

to compensate for the timing drift. The timing tracking circuit 24 has a first input connected to a first output of the message recovery circuit 22 for receiving an estimated signal $S_L$, and has a second input for the received signal. The timing tracking 24 is to derive a timing update decision based on the estimated signal and the received signal. An output of the timing tracking circuit 24 is connected to a third input of the message recovery circuit 22 and provides the new timing ($n_{k+1}$, $frac_{k+1}$) to the next block of message recovery circuit 22. The message recovery circuit 22 uses the timing ($n_{k+1}$, $frac_{k+1}$) and the received signal to detect the message symbols $S_L$. An output of the message recovery circuit 22 is connected to a first input of a device controller 26 for providing a message signal containing one or more bits $b_L$. An input/output terminal of device controller 26 is connected to one or more I/O (input/output) devices 28. It should be understood that the input/output terminal may be a serial port or a parallel port. A first output of device controller 26 is connected to an input of a transmitter (Tx) 19 that functions as a first transmitter of communication device 10. An output of transmitter 19 is connected to a third terminal of switch 13. A second output of device controller 26 is connected to an input of a transmitter 29 that functions as a second transmitter of communication device 10. An output of transmitter 29 is connected to a first terminal of a switch 32. A second terminal of switch 32 is connected to an antenna 31. A third terminal of switch 32 is connected to a receiver (Rx) 30 that functions as a second receiver for communication device 10. Switch 32 is controlled in response to whether communication device 10 is transmitting or receiving via antenna 31. An output of receiver (Rx) 30 is connected to a second input of device controller 26.

In operation, a transmitted data signal is received via a data communication link at the antenna 12. The received signal is at a carrier frequency and is down converted to base band by the mixer 14 in a conventional manner. The base band signal is low pass filtered by filter 16 prior to being converted from an analog signal to a digital signal. The digitized signal is first passed through the synchronizer 20 that derives the beginning of a data packet specified by the initial timing ($n_k$, $frac_k$). The value $n_k$ is a sample index of the incoming sample and the value $frac_k$ is a fraction of a sampling interval that will be explained further below in connection with FIG. 5. The sum of $n_k$ and $frac_k$ provides the beginning of the center of the first data symbol or the beginning of the first data symbol. Timing tracking circuit 24 updates the timing with the aid of the message recovery circuit 22 that implements symbol recovery by producing recovered symbols and thereby perform a data or message recoverer function. Timing tracking circuit 24 implements a timing tracker function and provides an updated value for $frac_{k+1}$ and $n_{k+1}$ for the next data block k+1. Both the timing tracking circuit 24 and the message recovery circuit 22 will be explained in further detail below. The message recovery circuit 22 provides an output data bit or bits labeled $b_L$ that are coupled to control device controller 26. Device controller 26 functions, in part, to distribute the data bit or bits $b_L$ to one or more I/O devices 28. For example, one of the I/O devices 28 may be a display. Additional functions of I/O devices 28 include a keyboard, a display input, memory, or a coprocessor. The I/O devices 28 may also provide data to device controller 26 that is routed to transmitter 19 for transmission via the antenna 12. Device controller 26 also functions to receive information via antenna 31 to route to the I/O devices 28. Device controller 26 may also provide information to transmitter 29 for transmission via antenna 31. It should be well understood that portions of the functionality of communication device 10 illustrated in FIG. 3 may be implemented in software rather than with hardware circuitry.

Figure 4:
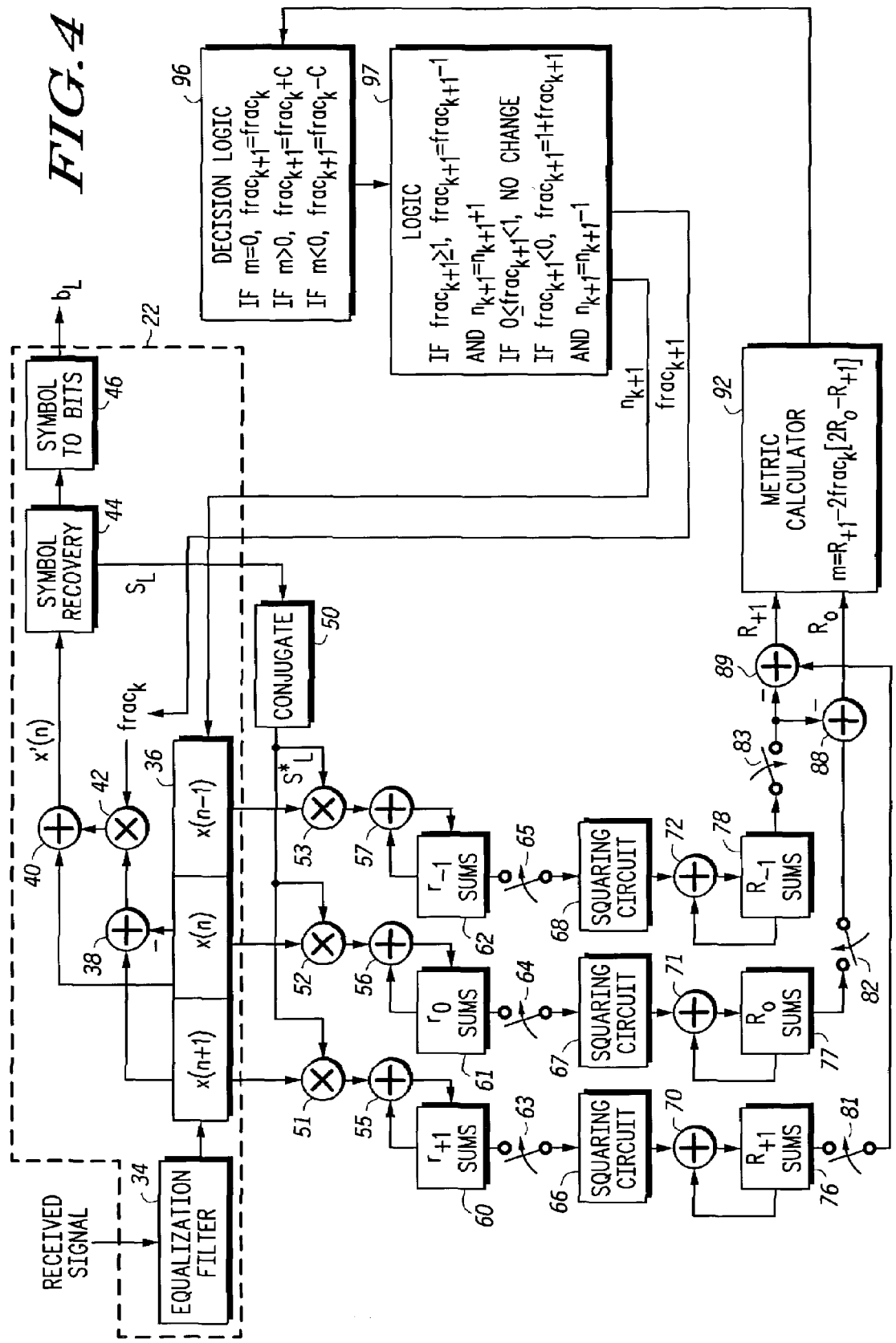
FIG. 4 illustrates in block diagram form a timing tracking system in accordance with the present invention.

Illustrated in FIG. 4 is a further detail of message recovery system 22. A received signal from A/D converter 18 is connected to an input of an equalization filter 34. An output equalization filter 34 is connected to registers 36 for storing the values x(n+1), x(n) and x(n−1). The value x(n+1) is connected to a first input of a subtractor 38. The value x(n) is connected to a second input of subtractor 38 and to a first input of an adder 40. An output of subtractor 38 is connected to a first input of a multiplier 42. A second input of multiplier 42 is connected to the value $frac_k$. An output of multiplier 42 is connected to a second input of adder 40. An output of adder 40 is connected to an input of a symbol recovery 44 for providing the interpolated value x'(n). The value x'(n) is derived using $frac_k$ and a first order (linear) interpolation of x(n) and x(n+1). In practice, it may be desired to use more than two signal samples with a high order polynomial interpolation. A first output of symbol recovery 44 is connected to an input of the symbol to bits circuit 46 that provides the data bit or bits $b_L$. A second output of symbol recovery 44 is connected to an input of a conjugate circuit 50 for providing the value $S_L$. An output of the conjugate circuit 50 is connected to a first input of multipliers 51, 52 and 53. The value x(n+1) is connected to a second input of multiplier 51. The value x(n) is connected to a second input of multiplier 52. The value x(n−1) is connected to a second input of multiplier 53. An output of multiplier 51 is connected to a first input of an adder 55. An output of adder 55 is connected to an input of an accumulated summing circuit 60 for accumulating $r_{+1}$ sums. An output of the accumulated summing circuit 60 is connected to a second input of adder 55. An output of multiplier 52 is connected to a first input of an adder 56. An output of adder 56 is connected to an input of an accumulated summing circuit 61 for accumulating $r_0$ sums. An output of the accumulated summing circuit 61 is connected to a second input of adder 56. An output of multiplier 53 is connected to a first input of an adder 57. An output of adder 57 is connected to an input of an accumulated summing circuit 62 for accumulating $r_{-1}$ sums. An output of the accumulated summing circuit 62 is connected to a second input of adder 57. An output of accumulated summing circuit 60 is connected to a first terminal of a switch 63. A second terminal of switch 63 is connected to a squaring circuit 66. An output of squaring circuit 66 is connected to a first input of an adder 70. An output of accumulated summing circuit 61 is connected to a first terminal of a switch 64. A second terminal of switch 63 is connected to a squaring circuit 67. An output of squaring circuit 67 is connected to a first input of an adder 71. An output of accumulated summing circuit 62 is connected to a first terminal of a switch 65. A second terminal of switch 65 is connected to a squaring circuit 68. An output of squaring circuit 66 is connected to a first input of an adder 72. An output of adder 70 is connected to an input of an accumulated summing circuit 76. A first output of accumulated summing circuit 76 is connected to a second input of adder 70. An output of accumulated summing circuit 76 is connected to a first terminal of a switch 81. An output of adder 71 is connected to an input of an accumulated summing circuit 77. A first output of accumulated summing circuit 77 is connected to a second input of adder 71. An output of accumulated summing circuit 77 is connected to a first terminal of a switch 82. An output of adder 72 is connected to an input of an accumulated summing circuit 78. A first output of accumulated summing circuit 78 is connected to a second input of adder 72. An output of accumulated summing circuit 78 is connected to a first terminal of a switch 83. A second terminal of switch 82 is connected to a first input of an adder 88. A second terminal of switch 83 is connected to a second input of adder 88 and to a first input of an adder 89. A second terminal of switch 81 is connected to a second input of an adder 89. An output of adder 88 is connected to a first input of a metric calculator 92 for providing a value R0. An output of adder 89 is connected to a second input of metric calculator 92 for providing a value $R_{+1}$. (where is R0 and R−1) An output of metric calculator 92 is connected to an input of a decision logic 96. An output of decision logic 96 is connected to an input of a logic circuit 97. A first output of logic circuit 97 is connected to a control input of registers 36. A second output of logic circuit 97 is connected to the second input of multiplier 42 for providing an update value of $\text{frac}_n$.

In operation, the message recovery circuit 22 receives a signal from the low pass filter 16 that has been digitized by converter 18 to digital form. Equalization filter 34 shapes the received symbol pulse to a desired shape. The received signal samples are stored by registers 36 on the basis of time as represented by time points (n−1), n, (n+1), etc. The signal samples for time (n+1) and (n) are used by an interpolator formed by subtractor 38 and adder 40 and multiplier 42 to generate the signal, $S_L$, at the Lth symbol center. The symbol recovery circuit 44 will use the signal at the symbol centers to recover the data symbols. The recovered data symbol and the received signal, x(n+1), x(n) and x(n−1) are used by the timing tracker to derive the timing update $n_{k+1}$, $\text{franc}_{k+1}$.

The timing tracker 24 has a first correlator in the form of multiplier 51, adder 55, accumulated summing circuit 60, squaring circuit 66, adder 70 and accumulated summing circuit 76. Timing tracker 24 has a second correlator in the form of multiplier 52, adder 56, accumulated summing circuit 61, squaring circuit 67, adder 71 and accumulated summing circuit 78. Timing tracker 24 also has a third correlator in the form of multiplier 53, adder 57, accumulated summing circuit 62, squaring circuit 68, adder 72 and accumulated summing circuit 78. Timing tracker 24 calculates a first correlation (55, 60), a second correlation (56, 61) and a third correlation (57, 62) respectively corresponding in time to a next sample, a present sample, and an immediately past sample. First, second and third samples of the data signal are correlated with recovered data symbols from symbol recovery 44 and conjugate 50 to respectively produce a first correlation value $R_{+1}$, a second correlation value $R_0$ and a third correlation value $R_{-1}$. Multiple correlations are accumulated over a predetermined number of symbols before each of switches 63, 64 and 65 are closed to calculate the magnitude square of each correlation. The magnitude square of each correlation is calculated by squaring circuits 66–68, respectively. The sum of the correlations and magnitude square of the sum for each correlation is as follows for segment $r_0$:

$$r_0(i) = |\sum_{L=1}^{Z} r_0(i, L)|^2 \qquad \text{(EQ. 1)}$$

where Z is a predetermined integer value.

Similarly, the sum of the correlations and magnitude square of the sum for each correlation is as follows for segment $r_{+1}$:

$$r_{+1}(i) = |\sum_{L=1}^{Z} r_{+1}(i, L)|^2 \qquad \text{(EQ. 2)}$$

Additionally, the sum of the correlations and magnitude square of the sum for each correlation is as follows for segment $r_{-1}$:

$$r_0(i) = |\sum_{L=1}^{Z} r_0(i, L)|^2 \qquad \text{(EQ. 3)}$$

Each of the correlation magnitudes is accumulated, and the results are respectively stored in accumulation registers 76–78. The sum of the correlation magnitudes for each segment is as follows for segment $R_0$:

$$R_o = \sum_{i=1}^{I} r_0(i)^2 \qquad \text{(EQ. 4)}$$

The value in accumulation register 78 is subtracted by subtractors 88 and 89 from the values in accumulation registers 76 and 77 before a decision metric, M, is calculated.

Metric calculator 92 functions to perform the calculation:

$$M = R_{+1} - 2\text{frac}_k[2R_0 - R_{+1}] \qquad \text{(EQ. 5)}$$

where $\text{frac}_k$ is the current timing used for the incoming signal linear interpolation 38, 40, 42. The nature of this metric is to reflect the relationship of the new timing $\text{frac}_{k+1}$ relative to the current timing $\text{frac}_k$, based on relationship between the current timing $\text{frac}_k$ and the second order polynomial peak location curve matched from the points $R_{-1}$, $R_0$ and $R_{+1}$. Decision logic 96 functions to provide a timing update for $\text{frac}_{k+1}$ based on the metric calculated by metric calculator 92. If the metric value is zero, then the new time $\text{frac}_{k+1}$ is the same as the presently existing value $\text{frac}_k$. If the metric value is less than zero, the new $\text{frac}_{k+1}$ value is updated earlier by a predetermined constant in the form of time constant, C. This is accomplished by subtracting the time constant C from $\text{frac}_k$. If the metric value is greater than zero, the new $\text{frac}_{k+1}$ value is updated later by the predetermined time constant, C. This is accomplished by adding the time constant C to $\text{frac}_k$. The time constant C is a value slightly greater than the maximum amount of time drift that can possibly occur during an updating block. Logic 97 functions as a clock update to adjust the values of $n_{k+1}$ and $\text{frac}_{k+1}$ prior to providing the new values of $n_{k+1}$ and $\text{frac}_{k+1}$ to the interpolator circuitry. The purpose of the clock update is to adjust the timing clock when the difference between transmit and receive has become greater or lesser than one sample period. Logic 97 performs this function by determining whether or not the determined value of $\text{frac}_{k+1}$ is greater than one, less than zero, equal to zero or somewhere between zero and one. If the new value of $\text{frac}_{k+1}$ is greater or equal to one, then $\text{frac}_{k+1}$ is subtracted by one and the sample index value $n_k$ is adjusted in time to the next sample index value. If the new value of $\text{frac}_{k+1}$ is less than zero, then $\text{frac}_{k+1}$ is added by one and the sample index value $n_{k+1}$ is adjusted in time to the prior sample index value. If the new value of $\text{frac}_{k+1}$ is equal to zero or somewhere between zero and one, then there is no change to the value $n_{k+1}$ and $\text{frac}_{k+1}$. Therefore, metric calculator 92, decision logic 96 and logic 97 form a timing updater.

Figure 5:
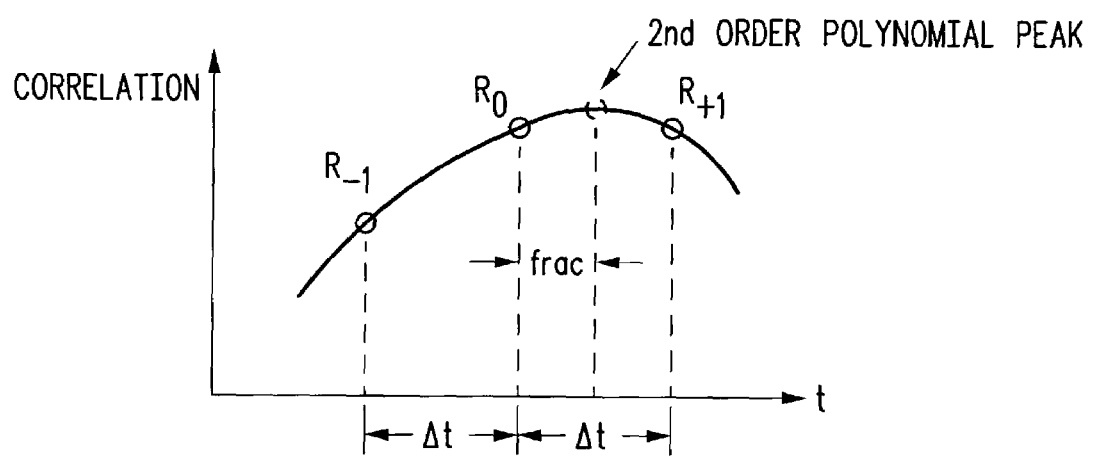
FIG. 5 illustrates in graphical form a correlation function used to implement the timing tracking in the system of FIG. 3.

Illustrated in FIG. 5 is a graph of a second order polynomial curve that explains how frac is calculated from three consecutive correlation values. The magnitude of each of $R_{-1}$, $R_0$, and $R_{+1}$ represents the degree of correlation between the received signal and the recovered symbol (i.e. the estimated transmitted symbol). The value on the graph that is designated as the second order polynomial peak is derived from the values of $R_{-1}$, $R_0$ and $R_{+1}$.

By now it should be appreciated that there has been provided a system and method that is a very power efficient and cost effective approach to symbol timing tracking in a digital communication system to compensate for the clock speed mismatch between a transmitter and a receiver. For every X symbols, where X is a predetermined integer, a timing update is made. The timing update, $n_{k+1}$ and $\text{frac}_{k+1}$, is derived from a predetermined portion of the X symbols to accumulate statistics about the timing drift. The number of the symbols in the predetermined portion of X symbols is much less than one hundred percent of the symbols in a block since immediately after a timing update, time is needed before additional timing update information is evident in the received signal. The percentage depends on the desired accuracy of the timing drift estimation, which depends on the operation range of the system. The larger the percentage that X represents, the longer a portion of bit pattern in the bit sequence that results in a D.C. signal shape is allowed without retransmission being required. If retransmission is required to deliver the message, the bit pattern of the portion of bits will be altered due to bit whitening on retransmission. The system and method may be used in many differing types of communication systems, such as in phase shift keying (PSK) channels and M-DPSK channels, Bluetooth High Rate systems, 802.11(b) protocol systems and others. The difference between such communication system protocols exists in the symbol recovery approach that depends upon the type of modulation specified by the protocol.

The system provided herein is insensitive to carrier error and functions at below sensitivity level due to the squaring circuits 66, 67, and 68. By forming the magnitude square of the accumulated $r_{-1}$, $r_0$ and $r_{+1}$ values, phase error accumulation is avoided. This advantage is achieved, in part, by accumulating a predetermined finite number of values to reduce signal cancellation due to phase error.

In the foregoing specification, the invention has been described with reference to specific embodiments. However, one of ordinary skill in the art appreciates that various modifications and changes can be made without departing from the scope of the present invention as set forth in the claims below. For example, some or all of the functionality illustrated may be implemented by either software code or hardware circuitry. Accordingly, the specification and figures are to be regarded in an illustrative rather than a restrictive sense, and all such modifications are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

I claim:

1. A timing tracker for use in a communication device that communicates data with symbols and uses a symbol recovery function, the timing tracker comprising:
    a first correlator for producing a first correlation value, $R_{+1}$ corresponding to a next signal sample in time relative to current timing for data recovery, as a function of received samples and recovered symbols;
    a second correlator for producing a second correlation value, $R_0$ corresponding to a present signal sample in time relative to current timing for data recovery, as a function of received samples and recovered symbols;
    a third correlator for producing a third correlation value, $R_{-1}$ corresponding to an immediately past signal sample in time relative to current timing for data recovery, as a function of received samples and recovered symbols; and
    a timing updater for updating a current timing, $n_k$ and $\text{frac}_k$, to a new timing, $n_{k+1}$ and $\text{frac}_{k+1}$, for data recovery on a next successive block of data, using the first correlation value, the second correlation value and the third correlation value and the current timing $n_k$ and $\text{frac}_k$, where $n_k$ is a sample index for a kth block of data that defines a location of a symbol and where $\text{frac}_k$ defines a symbol center after the sample index $n_k$.

2. The timing tracker of claim 1, wherein the new timing, $n_{k+1}$ and $\text{frac}_{n+1}$, is updated from current timing $n_k$ and $\text{frac}_k$ based on a relative location with respect to the current timing of a peak of a second order polynomial curve formed by the first correlation value $R_{-1}$, the second correlation value $R_0$ and the third correlation value $R_{+1}$.

3. The timing tracker of claim 1, wherein the timing updater further comprises:
    a metric calculator that calculates a value m, wherein $m = R_{+1} - 2\text{frac}_k[2R_0 - R_{+1}]$ where the first correlation value is $R_{+1} = R_{+1} - R_{-1}$, the second correlation value is $R_0 = R_0 - R_{-1}$; and
    first means coupled to the metric calculator for determining a value of $\text{frac}_{k+1}$, wherein $\text{frac}_{k+1}$ is $\text{frac}_k$ if m=0, $\text{frac}_{k+1}$ is $\text{frac}_k+C$ if m>0, and $\text{frac}_{k+1}$ is $\text{frac}_k-C$ if m<0, where C is a predetermined constant.

4. The timing tracker of claim 3 wherein initial values of $n_k$ and $\text{frac}_k$ are provided by a synchronizer.

5. The timing tracker of claim 3 further comprising:
    second means coupled to the first means for adjusting timing values $n_{k+1}$ and $\text{frac}_{k+1}$; and
    interpolator means coupled to the second means for receiving adjusted timing values, the interpolator means providing a received signal with adjusted timing.

6. The timing tracker of claim 5 wherein the second means further comprises decision logic for implementing decisions as follows:

if $\text{frac}_{k+1} \geq 1$, $\text{frac}_{k+1} = \text{frac}_{k+1} - 1$ and $n_{k+1} = n_{k+1} + 1$;

if $0 \leq \text{frac}_{k+1} < 1$, then make no change to frack+1 and nk+1; and if $\text{frac}_{k+1} < 0$, $\text{frac}_{k+1} = \text{frac}_{k+1} + 1$ and $n_{k+1} = n_{k+1} - 1$.

7. The timing tracker of claim 5 wherein the first means and the second means are each implemented by either hardware circuitry, software code or a combination of both.

8. A communication device comprising:
a first transmitter for communicating via a first communication link;
a first receiver for communicating via the first communication link;
a second transmitter for transmitting data via a second communication link;
a second receiver for receiving data via the second communication link;
a controller coupled to the first transmitter, the first receiver, the second transmitter and the second receiver, the controller supporting communication flow between the first communication link and the second communication link through the communication device,
the second receiver comprising:
a synchronizer for periodically synchronizing the second receiver to received data;
a message recoverer producing recovered data for input to the controller, the message recoverer comprising an equalization filter, a shift register coupled to the equalization filter, a linear interpolator coupled to the shift register, a symbol recoverer coupled to the linear interpolator, and a symbol-to-bit converter for producing recovered information;
a timing tracker coupled to the message recoverer, the timing tracker comprising:
a first correlator and accumulator producing a first correlation signal $r_{+1}$;
a second correlator and accumulator producing a second correlation signal $r_0$;
a third correlator and accumulator producing a third correlation signal $r_{-1}$;
a first squaring circuit squaring the first correlation signal;
a second squaring circuit squaring the second correlation signal;
a third squaring circuit squaring the third correlation signal;
a first magnitude accumulator receiving an output of the first squaring circuit and producing a first correlation value $R_{+1}$;
a second magnitude accumulator receiving an output of the second squaring circuit and producing a second correlation value $R_0$;
a third magnitude accumulator receiving an output of the third squaring circuit and producing a third correlation value $R_{-1}$; and
a timing updater for generating updated timing $n_{k+1}$, $\text{frac}_{k+1}$ from the first, second and third correlation and current timing $n_k$, $\text{frac}_k$, where $n_k$ is a sample index for a kth block of data that defines a location of a symbol and where $\text{frac}_k$ defines a symbol center after the sample index $n_k$.

9. The communication device of claim 8, wherein the updated timing, $n_{k+1}$ and $\text{frac}_{n+1}$, is updated from current timing $n_k$ and $\text{frac}_k$ based on the relative location with respect to current timing of a peak of a second order polynomial curve formed by the first correlation value $R_{-1}$, the second correlation value $R_0$ and the third correlation value $R_{+1}$.

10. The communication device of claim 8, wherein the timing updater further comprises:
a metric calculator that calculates a value m, wherein $$m = R_{+1} - 2\text{frac}_k[2R_0 - R_{+1}]$$

where the first correlation value is $R_{+1} = R_{+1} - R_{-1}$, the second correlation value is $R_0 = R_0 - R_{-1}$; and first means coupled to the metric calculator for determining a value of $\text{frac}_{k+1}$, wherein $\text{frac}_{k+1}$ is $\text{frac}_k$ if m=0, $\text{frac}_{k+1}$ is $\text{frac}_k + C$ if m>0, and $\text{frac}_{k+1}$ is $\text{frac}_k - C$ if m<0, where C is a predetermined constant.

11. A data receiver for maintaining clock alignments between data synchronization occurrences, comprising:
a synchronization circuit generating a current timing signal, $n_k$, $\text{frac}_k$ corresponding to a center location of a first symbol of a packet header of a packet of data;
a message recoverer coupled to the synchronization circuit for producing recovered symbols;
a timing tracker coupled to the message recoverer, the timing tracker comprising:
a plurality of correlators for producing correlation signals; and
a timing updater for generating an updated timing signal $n_{k+1}$, $\text{frac}_{k+1}$ from first, second and third correlation values and the current timing $n_k$, $\text{frac}_k$.

12. The data receiver as defined in claim 11, wherein the message recoverer further comprises an interpolator to provide a received signal, $x'(n)$, having adjusted timing.

13. The data receiver as defined in claim 12, wherein the interpolator generates the signal $x'(n)$ as a function of at least two samples and $\text{frac}_k$.

14. The data receiver as defined in claim 12, wherein $x'(n)$ is $$x'(n) = x(n+1) + \text{frac}_k[x(n+1) - x(n)].$$

15. The data receive as defined in claim 12, wherein the interpolator further comprises a symbol recovery circuit that operates in a phase shift keyed (PSK) channel.

16. The data receiver of claim 11, wherein the plurality of correlators further comprises:
a first correlator and accumulator producing a first signal ($r_{+1}$);
a second correlator and accumulator producing a second signal ($r_0$); and
a third correlator and accumulator producing a third signal ($r_{-1}$).

17. The data receiver as defined in claim 16, wherein the plurality of correlators further comprises:
a first squaring circuit coupled to the first correlator and accumulator for squaring the first signal;
a second squaring circuit coupled to the second correlator and accumulator for squaring the second signal; and
a third squaring circuit coupled to the third correlator and accumulator for squaring the third signal.

18. The data receiver as defined in claim 17, wherein the plurality of correlators further comprise:
a first magnitude accumulator coupled to the second squaring circuit for receiving an output of the second squaring circuit and producing a first correlation value ($R_{+1}$);
a second magnitude accumulator coupled to the second squaring circuit for receiving an output of the second squaring circuit and producing a second correlation value ($R_0$); and a third magnitude accumulator coupled to the second squaring circuit for receiving an output of the second squaring circuit and producing a third correlation value ($R_{-1}$).

19. A method of operating a receiver to adjust timing of receiver data following synchronization, the method comprising the steps of:

receiving a data signal in blocks via a data communication link;

synchronizing the data signal to provide an initial timing values $n_0$ and $frac_0$, where $n_0$ is a sample index for a first block of data that defines a location of a first symbol and where $frac_0$ defines a symbol center after the sample index $n_0$;

recovering data symbols from each of the blocks of the data signal;

correlating first samples of the data signal with recovered data symbols to produce a first correlation value ($R_{+1}$);

correlating second samples of the data signal with recovered data symbols to produce a second correlation value ($R_0$);

correlating third samples of the data signal with recovered data symbols to produce a third correlation value ($R_{-1}$);

deriving updated timing values, $n_{k+1}$ and $frac_{k+1}$ for a next data block from the first correlation value, the second correlation value, the third correlation value and current timing values, $n_k$ and $frac_k$; and adjusting sampling of the data signal in the next data block using the updated timing values $n_{k+1}$ and $frac_{k+1}$.

20. A method of operating a receiver to adjust timing of a receiver clock to align with symbols of a received data signal transmitted by a transmitter, comprising:

receiving a synchronization signal at a beginning of the received data signal;

generating a timing signal, $n_0$ and $frac_0$, from the synchronization signal for a first block of data;

generating correlation signals ($R_{-1}$, $R_0$, $R_{+1}$) from recovered symbols in the first block of data correlated with samples of the received data signal of the first block; and generating an updated timing signal, $n_1$ and $frac_1$, for symbol recovery for a second block of data from the correlation signals and the timing signal $n_0$ and $frac_0$ based on the relative location with respect to the current timing of a peak of a second order polynomial curve formed by the correlation signals.

21. The method of claim 20, further comprising:

repeating the generating of the updated timing signal by repeating the generating of correlation signals and an immediately prior timing signal.

* * * * *